US007524430B2

(12) United States Patent
Krawczyk et al.

(10) Patent No.: US 7,524,430 B2
(45) Date of Patent: Apr. 28, 2009

(54) FLUID EJECTION DEVICE STRUCTURES AND METHODS THEREFOR

(75) Inventors: John W. Krawczyk, Richmond, KY (US); Andrew L. McNees, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 384 days.

(21) Appl. No.: 11/026,839

(22) Filed: Dec. 30, 2004

(65) Prior Publication Data

US 2006/0055724 A1 Mar. 16, 2006

(51) Int. Cl.
*B29D 11/00* (2006.01)

(52) U.S. Cl. ............................... 216/27; 216/2; 216/33; 216/41; 216/67; 216/79; 216/99; 347/20; 347/63; 347/65; 438/21; 438/719; 438/739; 438/740

(58) Field of Classification Search .................. 216/27; 347/20; 438/21

See application file for complete search history.

(56) References Cited

U.S. PATENT DOCUMENTS

| | | | | |
|---|---|---|---|---|
| 5,890,745 | A * | 4/1999 | Kovacs | 285/24 |
| 6,348,295 | B1 * | 2/2002 | Griffith et al. | 430/198 |
| 6,555,480 | B2 | 4/2003 | Milligan et al. | |
| 6,746,107 | B2 * | 6/2004 | Giere et al. | 347/65 |
| 6,776,915 | B2 * | 8/2004 | Beatty et al. | 216/27 |
| 2004/0246311 | A1 * | 12/2004 | Silverbrook | 347/57 |

OTHER PUBLICATIONS

P.C.Boyle, Jounral of Physics, D (Applied Physics), vol. 37, (2004), 697-701.*

* cited by examiner

*Primary Examiner*—Nadine Norton
*Assistant Examiner*—Maki Angadi
(74) *Attorney, Agent, or Firm*—Dinsmore & Shohl, LLP

(57) ABSTRACT

Methods of forming a fluid channel in a semiconductor substrate may include applying a material layer to at least one surface of the semiconductor substrate. The method may further include manipulating the material layer to form a surface topography corresponding to a channel, the surface topography being configured to control directionality of ion bombardment of said substrate along electromagnetic field lines in a plasma sheath coupled to said surface topography.

19 Claims, 11 Drawing Sheets

FLUID EJECTION DEVICE STRUCTURES AND METHODS THEREFOR

This application is also filed concurrently with a corresponding and owned U.S. patent application Ser. No. 11/026,353 entitled “Fluid Ejection Device Structures And Methods Therefor”.

FIELD OF THE INVENTION

The invention relates to fluid ejection device structures, and in particular to methods of forming channels in semiconductor substrates.

BACKGROUND OF THE INVENTION

Ink jet printers continue to be improved as the technology for making the printheads continues to advance. New techniques are constantly being developed to provide low cost, highly reliable printers which approach the speed and quality of laser printers. An added benefit of ink jet printers is that color images can be produced at a fraction of the cost of laser printers with as good or better print quality than laser printers. All of the foregoing benefits exhibited by ink jet printers have also increased the competitiveness of suppliers to provide comparable printers in a more cost efficient manner than their competitors.

One area of improvement in the printers is in the print engine or printhead itself. This seemingly simple device is a relatively complicated structure containing electrical circuits, fluid channels and a variety of intricate, diminutive parts assembled with precision to provide a powerful, yet versatile ink jet pen. The primary components of the ink jet printhead are a semiconductor chip or substrate, a nozzle plate and a flexible circuit attached to the substrate. The semiconductor substrate is typically made of silicon and contains various passivation layers, conductive metal layers, resistive layers, insulative layers and protective layers deposited on a device side thereof (e.g., the side configured to secure ink ejecting devices thereon such as resistors and nozzle plates). The semiconductor substrate may comprise one or more fluid channels having specific geometries to control the characteristics of fluid flow (e.g., ink) to the nozzle plate. More particularly, because different systems or fluids require different channel diameters, delivery angles and numbers of channels to properly deliver the ink to the nozzle plate, forming fluid channels having specific shapes or geometries in the semiconductor substrate is desirable. However, forming such fluid channels creates issues in that multiple steps are required to create these openings and because of the delivery angles desired, these channels are difficult to form.

Accordingly, there continues to be a need for fluid channels with specific shapes and geometries and improved processes for making the same.

SUMMARY OF THE INVENTION

Accordingly, the present invention is intended to address and obviate problems and shortcomings and otherwise improve previous methods for forming fluid channels.

To achieve the foregoing, one exemplary embodiment of the present invention is a method of manipulating plasma sheath formation. The method comprises applying a material layer to a surface of a semiconductor substrate. The method further comprises manipulating the material layer to form a surface topography corresponding to a channel, coupling plasma to the surface topography and etching the semiconductor substrate to form the channel.

Another exemplary embodiment of the present invention is a method of forming a channel in a semiconductor substrate. The method comprises applying a material layer to at least one surface of the semiconductor substrate, manipulating the material layer to form a surface topography corresponding to a channel, the surface topography being configured to control directionality of ion bombardment of the substrate along electromagnetic field lines in plasma coupled to the surface topography, and etching the the semiconductor substrate to form the channel.

Yet another exemplary embodiment of the present invention is a method for manufacturing a printhead for an ink jet printer. The method comprises applying a material layer to at least surface of a semiconductor substrate. The method further comprises exposing the material layer to sufficient light radiation energy through a gray scale mask configured with a template corresponding to the channel to form a surface topography corresponding to the channel, wherein the surface topography may be configured to be coupled to a plasma to control directionality of ion bombardment along electromagnetic field lines in the plasma. The method further comprises etching the substrate to form the channel and attaching the semiconductor substrate to a nozzle plate, an electrical circuit and a printhead body to form an ink jet printhead.

In yet another exemplary embodiment of the present invention is a method of controlling the directionality of an etch. The method comprises manipulating a surface topography of a semiconductor substrate and etching the substrate to form the channel.

The present methods are advantageous for providing, generally, the fluid channels in semiconductor substrates, and particularly, fluid channels in semiconductor substrates for use in an ink jet printhead.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

Figure 1:
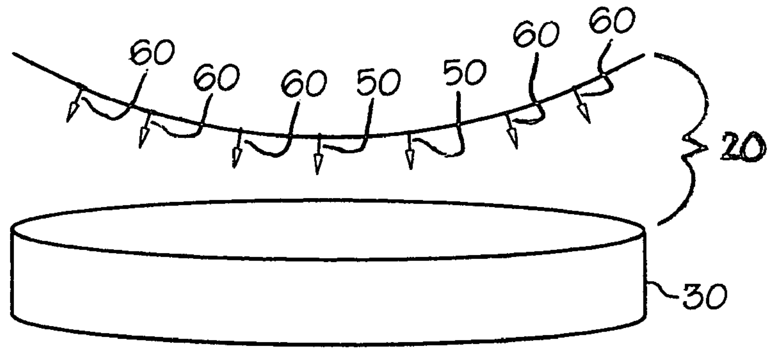
FIG. 1 is a schematic representation of ion movement through a plasma sheath in accordance with an exemplary embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE EXEMPLARY EMBODIMENTS

Reference will now be made in detail to various embodiments of the invention, examples of which are illustrated in the accompanying drawings, wherein like numerals indicate similar elements throughout the views.

The principle of forming specifically shaped fluid channels can be accomplished by the manipulation of a material layer on a substrate surface to form a surface topography on the substrate to affect plasma sheath characteristics during the etching process. More particularly, as an introduction, deep reactive ion etching (DRIE) is accomplished by a series of etch and passivation steps commonly referred to as the "Bosch process" wherein two different gas compositions are alternated in a reactor. At the onset of this process, free electrons of the first gas are lost to the walls of the plasma chamber and substrate to be acted upon. As a result of this electron movement, an electric field is established in the space between negatively charged walls of the chamber and the substrate and the positively charged thin membrane at the outer extremity of the bulk plasma. This space is known as the sheath. The sheath effectively acts as a energy hill for electrons to overcome and an energy valley or downward slope through which positively charged species (e.g. ions that aid in etching the substrate) are accelerated.

The electromagnetic field lines in the sheath are typically perpendicular to the edge of the sheath-bulk boundary. Thus, the path of travel of positively charged species in the sheath is substantially along the electromagnetic field lines at approximately a 90° angle to the sheath-bulk plasma boundary. For example, a schematic illustration of a portion of a sheath 20 is shown in relation to a substrate 30, such as a semiconductor substrate, in FIG. 1. As illustrated, the boundary of the sheath 20 is effectively parallel to the surface of the substrate 30 toward the center of the substrate 30. At these locations, during etching, positively charged species travel substantially along the field lines 50, in the sheath 20 and contact the substrate 30 at approximately 90° angles. Toward the perimeter of the substrate 30, the boundary of the sheath 20, as illustrated in FIG. 1, is no longer perpendicular to the substrate in this region, therefore positively charged species entering the sheath 20, are accelerated tangentially along the field lines 60 and contact the substrate 30 at varying degreed angles. The effect of such off perpendicular trajectories toward the substrate 30 results in conventionally disfavored side effects such as side wall breakdown and substrate damage, and ultimately a phenomenon known as "tilt." More specifically, tilt is the discrepancy between mid points of the top (plasma side) and bottom (etch stop side) openings of a fluid channel. As used herein, "channel" may include a fluid channel generally, and specifically, may include a single and/or multiple vias, slots and/or trenches.

Figure 2:
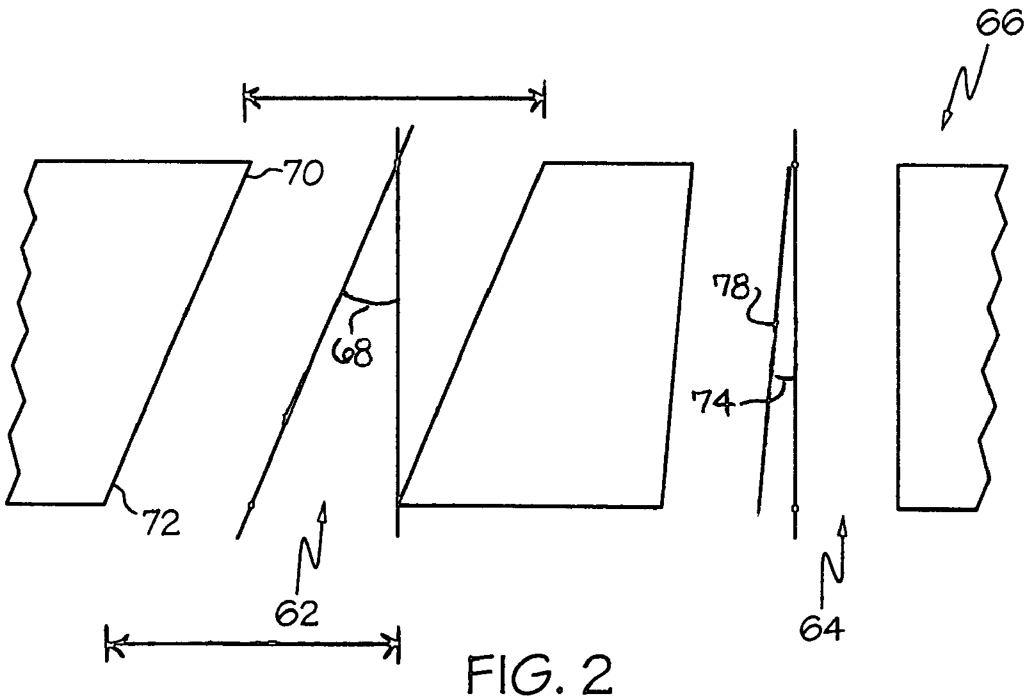
FIG. 2 is a schematic representation of the varying degrees of tilt of fluid channels created within a semiconductor substrate by the ion movement illustrated in FIG. 1.

For example, referring to FIG. 2, two fluid channels 62 and 64 are formed within a semiconductor substrate 66 illustrating varying degrees of tilt that may be caused by the off perpendicular field lines through the plasma sheath (e.g. fluid channel 62). Referring to fluid channel 62, the degree of tilt 68 (e.g. the angle between the midpoint of the upper opening 70 of fluid channel 62 and the midpoint of the lower opening 72 of fluid channel 62) is substantially greater than the degree of tilt 74 exhibited by fluid channel 64. Moreover, fluid channel 64 is generally symmetrical around the axis 78 joining the two mid points. One of the reasons for the discrepancy in the degrees of tilt between fluid channels 62 and 64 includes the ion trajectory through the plasma sheath (e.g., FIG. 1) during the etching process, which directly corresponds to, among other things, the surface topography of the substrate and/or material layer which can be polymeric or otherwise, as discussed later herein.

Although fluid channels exhibiting a degree of tilt (e.g., offset vias), such as fluid channel 62 in FIG. 2, have been generally disfavored in conventional trench or via manufacturing, it is believed that if the degree of tilt and the formation of the channel itself can be controlled, the result could be the advantageous creation of a specifically shaped fluid channel for use in a variety of applications. More particularly, because sheath formation is directly related to the surface topography of the substrate (e.g. geometry of the substrate), it is believed that by manipulating surface topography, sheath formation can be controlled to ultimately direct the trajectories of positively charged species that contribute to the formation of fluid channels in the etching process. Accordingly, specifically designed fluid channels can be formed for providing optimal control of ink delivery to a print media.

Figure 3:
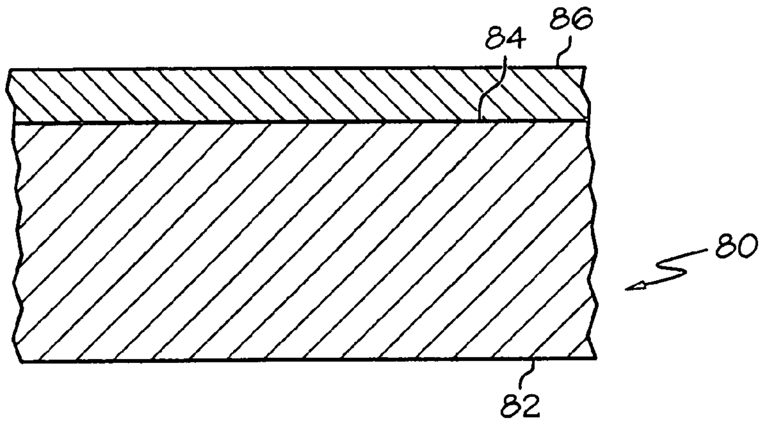
FIGS. 3-5 and 7-8 are schematic representations of a process for preparing a semiconductor substrate for use in an ink jet printhead in accordance with one exemplary embodiment of the present invention.

It is contemplated that plasma sheath formation can be influenced by, for example, manipulating semiconductor surface topography. In one embodiment, substrate surface topography may be manipulated by employing gray scale photo-lithographic techniques. For example, referring to FIG. 3, a semiconductor substrate 80 may include a first side (e.g. device side 82) and a second side (e.g. backside 84). In one embodiment, a photo-imageable material layer 86 may be spin-coated onto the backside 84 of the semiconductor substrate 80. Such material layer may include, but is not limited to acrylic and epoxy-based photoresists such as the photoresist materials available from Clariant Corporation of Somerville, N.J. under the trade names AZ4620 and AZ1512. Other photoresist materials are available from Shell Chemical Company of Houston, Tex. under the trade name EPON SU8, Olin Hunt Specialty Products, Inc. which is a subsidiary of the Olin Corporation of West Paterson, N.J. under the trade name WAYCOAT and Shin Etsu MicroSci under the trade name SIPR7121. In the embodiments illustrated in FIGS. 3-5, a single positive photo resist layer may be utilized, however, it is contemplated that any number and types of layers may be utilized to provide a desired photo-image for etching into the semiconductor substrate.

Figure 4:
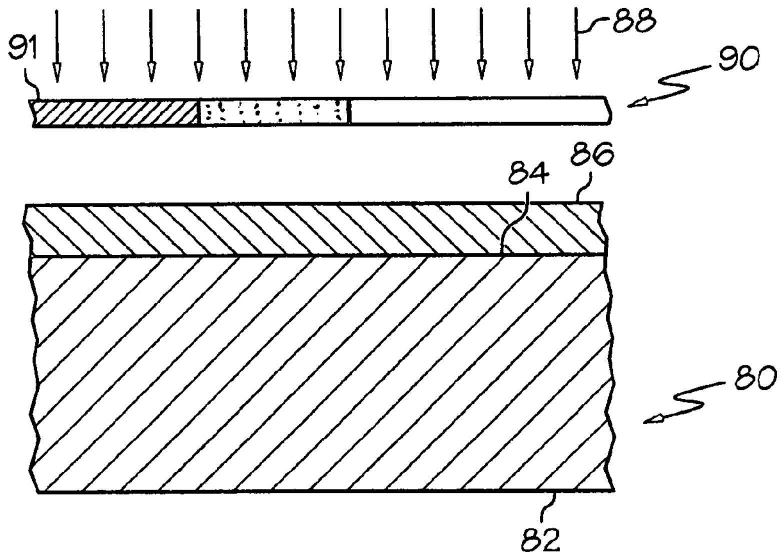

As illustrated in FIG. 4, ultraviolet (UV) radiation 88 may be applied to the material layer 86 on the backside of the semiconductor substrate 80 through a patterning element, here, a gray scale mask 90, corresponding to the desired geometry of a fluid channel within semiconductor substrate 80. More particularly, by manipulating chrome placement and surface area density, and other optical transmission properties of the mask 90 itself, the geometry of the material layer 86 may be manipulated which is believed to ultimately influence the plasma sheath (e.g., FIG. 6). For example, referring to FIG. 5, once UV radiation is applied to the photo-sensitive material layer 86 through the mask 90, the material layer 86 is modified to correspond to strategic patterns of light and shade in the mask 90 of FIG. 4 to form image 93. As illustrated, image 93 comprises the material layer 86 corresponding to mask 90. In another embodiment, the image may comprise any configuration of material layers and/or substrate material corresponding to the pattern of the gray scale mask 90.

Figure 5:
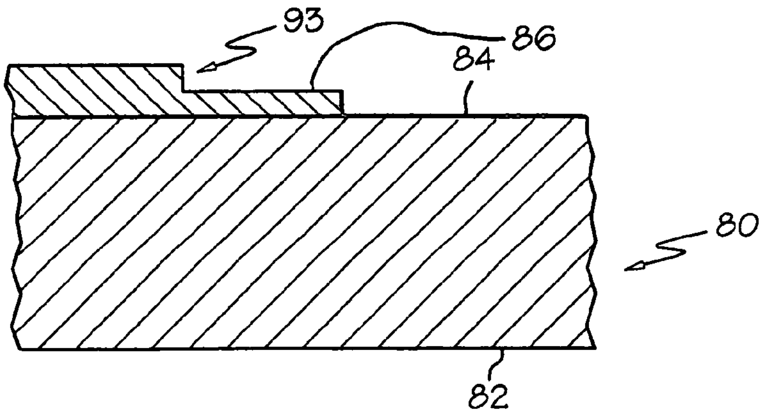

In FIG. 4, the pattern 91 in the mask 90 may be manipulated through strategic implementation of areas of light and shade arranged in a configuration corresponding to the desired feature or features to be transferred, (e.g. FIG. 7) including any size, shape and number of slots, to the etch masking material referred to as image 93. As illustrated in FIGS. 4 and 5, mask 90 may comprise a pattern 91 configured so as to produce an offset fluid channel as discussed later herein. Accordingly, it should be appreciated that the mask 90, or more specifically the pattern 91, may be manipulated by appropriately shading the units of the gray scale mask to control the amount of UV radiation that can pass through, ultimately to the photo-sensitive material layer.

Figure 6A:
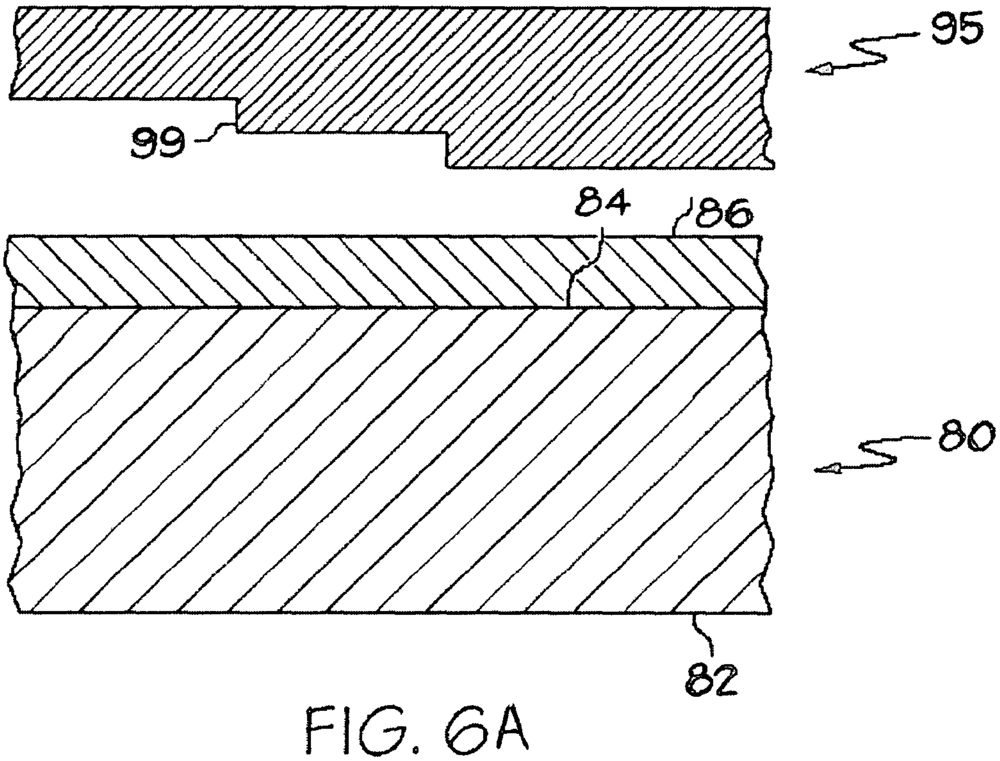
FIG. 6 is a schematic representation of an alternative embodiment for manipulating a material layer in accordance with one exemplary embodiment of the present invention.
Figure 6B:
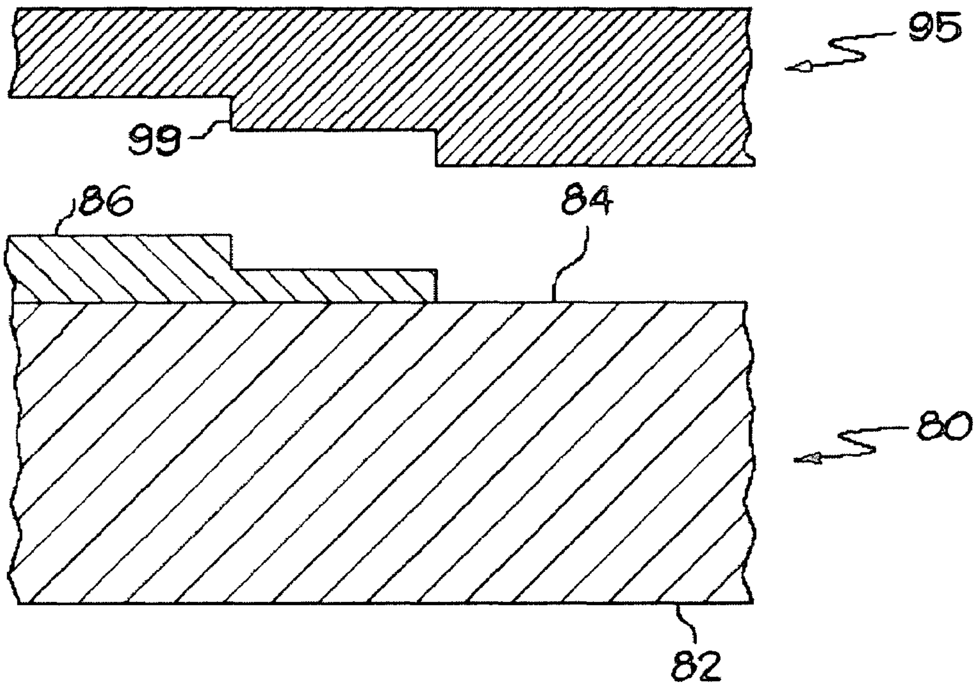

In addition, in another embodiment, a contact printing stamp may utilized as a patterning element to manipulate a material layer to form a desired surface topography. Referring to FIG. 6, contact printing utilizes a mold or "stamp" 95 pressed into the material layer 86, photo-sensitive or otherwise, to create a particular surface topography. The geometry of the "stamp" 95 used in contact printing may be manipulated through strategic implementation of a template comprising at least one unit 99. Unit 99, and additional units if required, may be arranged in a configuration corresponding to the negative image of the desired feature or features to be transferred to etch masking material 86, (see, e.g., FIG. 7) including any size, shape and number of slots. As illustrated in FIG. 6, unit 99, and at least a portion of the stamp 95, may be configured so as to produce an offset fluid channel as discussed later herein. In addition, units that make up the stamp 95 can be configured with a number of different geometries configured to correspond to a geometry and ultimately, after etching, a fluid channel, or more specifically, an individual slot or via. For example, in another embodiment, a plurality of units may be utilized to form one or more offset and/or symmetrical channels within the same semiconductor substrate. As used herein, the patterning element may be any device, substance or combination configured to manipulate the surface topography of a material layer associated with the substrate.

Figure 8:
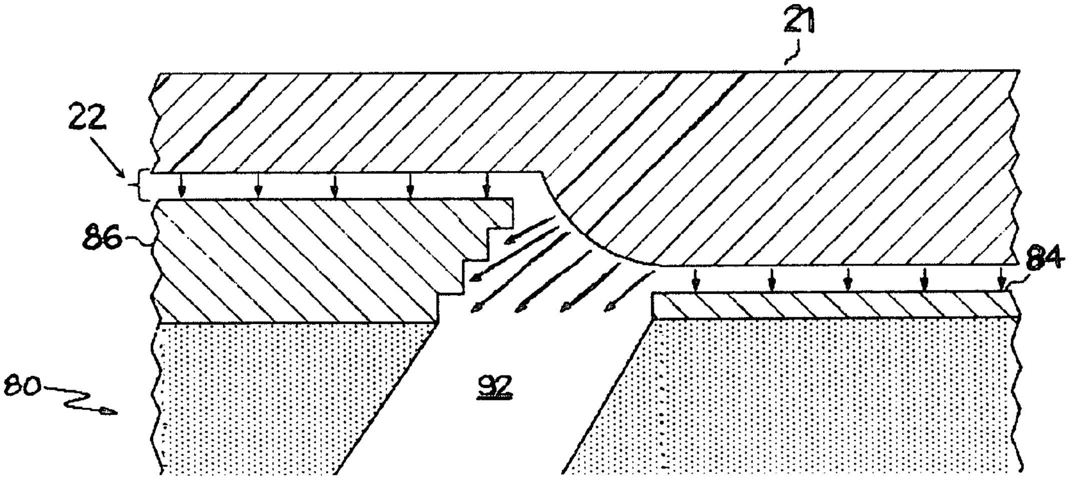

Referring again to FIG. 5, once the UV light through mask 90 (or through the use of stamp 95) has created the desired image (or imprint) 93 in the material layer 86 (e.g., FIG. 5), the material layer 86 and semiconductor substrate 80 may then be etched by, for example, reactive ion etching (RIE) or deep reactive ion etching (DRIE) to form fluid channels within the semiconductor substrate 80 from the first surface (i.e., the side of the substrate to which material layer 86 was applied, e.g., backside 84) through the second surface (e.g., device side 82) (e.g. FIG. 8). It should be understood that while the process of forming a fluid channel is herein described from the backside of the semiconductor substrate, fluid channels formed with processes herein can take place on the device side, backside or a combination. In order to form a fluid channel, the semiconductor substrate 80 containing the patterned material layer 86 may be placed in an etch chamber having a source of plasma gas and backside cooling such as with helium, water or liquid nitrogen. The semiconductor substrate 80 may be maintained below about 185° C., such as in a range of from about 50° to about 80° C., during the etching process. In the etching process, a deep reactive ion etch (DRIE) of the substrate is conducted using an etching plasma derived from, as an example, $SF_6$ and a passivating plasma derived from, as an example, $C_4F_8$ wherein the semiconductor substrate 80 is etched from a first side 84 toward a second side 82.

Figure 12:
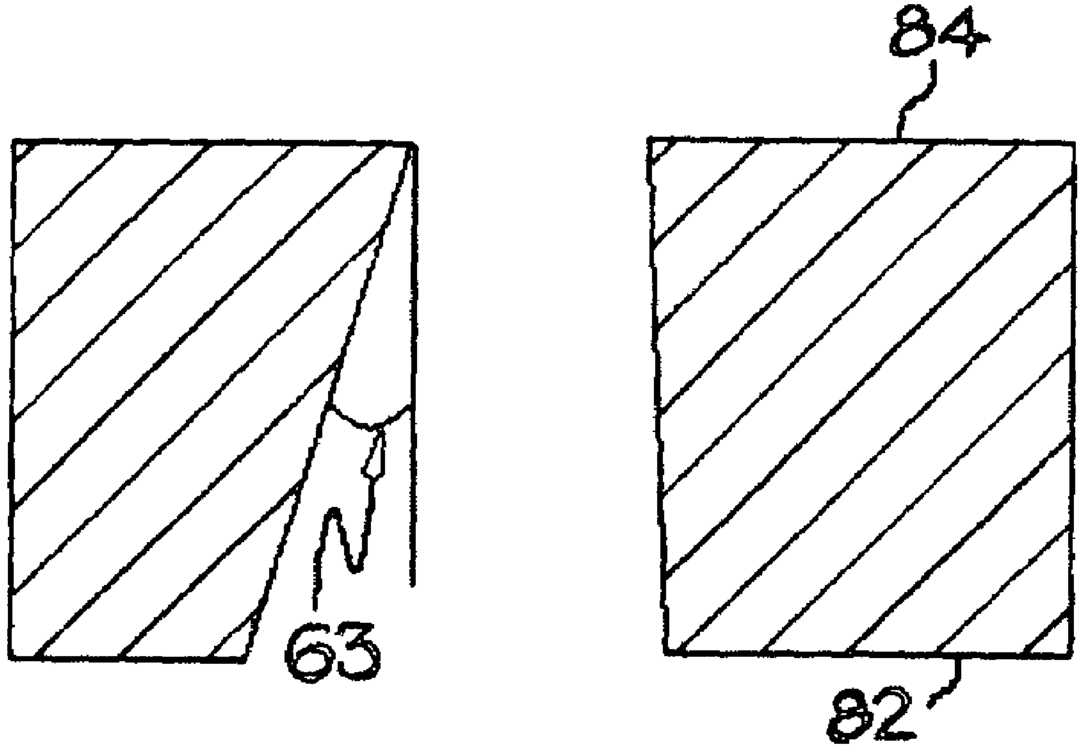
FIG. 12 is a schematic representation of a semiconductor substrate with a fluid channel formed according to another exemplary embodiment of the present invention.

During the etching process, the gas chemistry in the plasma chamber and the parameters defining the plasma characteristics are cycled between the passivating plasma step and the etching plasma step. Exemplary cycling times for each step range from about 3 to about 20 seconds per step. Gas pressure in the etching chamber can range from about 15 to about 150 millitorr at a chuck temperature ranging from about −20° to about 35° C. In one exemplary embodiment, the DRIE platen power ranges from about 240 to about 290 watts and the coil power ranges from about 1500 watts to about 3.5 kilowatts at frequencies ranging from about 10 to about 15 MHz. Etch rates may range from about 2 to about 10 microns per minute or more and produce vias having side wall profile angles 63 ranging from about 2° to about 10° or more as displayed in FIG. 12. Dry-etching apparatus suitable for forming fluid channel 92 (see FIG. 8) are available from Surface Technology Systems, Ltd. of Gwent, Wales. Procedures and equipment for etching silicon are described in European Application No. 838,839A2 to Bhardwaj, et al., U.S. Pat. No. 6,051,503 to Bhardwaj, et al., PCT application WO 00/26956 to Bhardwaj, et al. Once the fluid channel 92 is etched in the semiconductor substrate 80, the material layer 86 may be removed from the substrate 80 by, for example, solvents. Of course, the etching parameters described herein may be varied.

Figure 7:
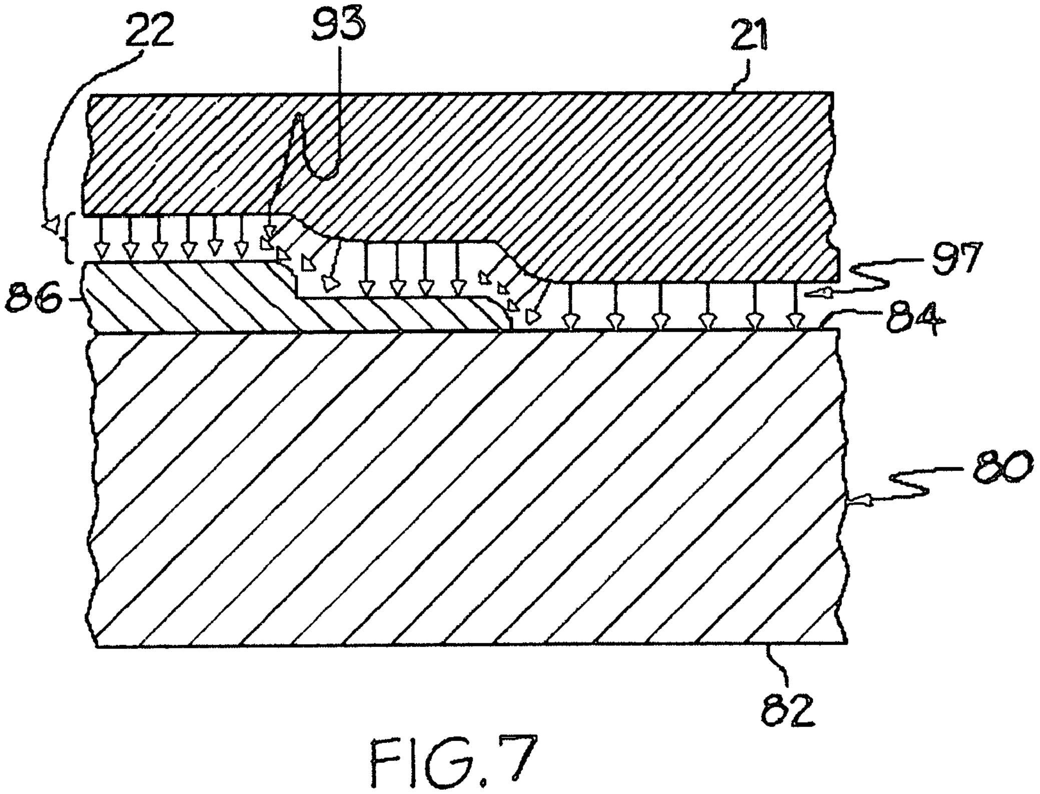

Referring to FIG. 7, during the DRIE passivation step described above, an etch inhibiting polymer is deposited on the first side 84 of the substrate 80 (including the image or imprint 93). For purposes of illustration, the bulk plasma 21 of FIGS. 7 and 8 is separated from the substrate by the plasma sheath 22 resulting in an electromagnetic field 97 directed from the bulk plasma-sheath interface towards the substrate. The directionality of the etch is primarily a result of the directionality of the ion bombardment along field lines 97 during the etching step. More particularly, referring to FIG. 8, since ion bombardment is a line of sight process, the features with the largest surface area parallel to the plasma sheath or perpendicular to ion bombardment will receive a disproportionately larger degree of passivation removal. The substrate devoid of passivation etches spontaneously in gases like $SF_6$ and continues to do so until the next passivation step which again deposits a fluorinated polymer indiscriminately over the substrate and into the developing fluid channel 92 to be later removed in the direction of the developing fluid channel by heavily biased ions in the subsequent etch step to follow. This process may be repeated until desired etch depth is achieved. By manipulating substrate surface topography (e.g. the geometry of the masking material), the direction of the ion bombardment during the etch step (e.g., the removal of the passivation) can be controlled thus influencing the strategic disposition of passivation removal.

Aside from the geometric topography of the substrate, another system characteristic that can be utilized for manipulating the formation and shape of the sheath is the sheath thickness, (s) represented by the following formula:

$$s=\lambda_{De}(2V_o/T_e)\hat{}0.5$$

wherein $\lambda_{De}$ is the Debye length, (measure of the distance over which significant charge densities can spontaneously exist ), $T_e$ is the electron temperature measured in volts, and $V_o$ is the voltage across the sheath. As such, sheath formation, as a function of $T_e$, $\lambda_{De}$ and $V_o$, may be influenced by manipulating a multitude of plasma parameters including plasma generating source type, ICP ECR MW etc., source power, chamber pressure, plasma chemistry, platen power and other parameters. It is believed that the smaller the sheath thickness, the more closely the sheath will follow the topography of the substrate. The more closely the sheath follows the topography of the substrate, the more susceptible ion trajectories are to strategic modification as described herein.

Accordingly, the exemplary embodiments of the present invention establish a controllable surface topography so as to properly guide the etch. The surface topography formed by the material layer and/or substrate layer (or additional layers if desired) discussed herein can be affected by a number of controllable factors of the patterning element including the strategic patterns of light and shade in the gray scale mask and, where utilized, the shape of the stamp, (more specifically the units 99 forming the stamp). For example, each section or pattern in the gray scale mask or each unit or step of the stamp used in contact printing may be individually formed to correspond to a desired surface topography and hence, upon etching, a particular fluid channel geometry. Patterns and units may be offset as illustrated in FIGS. 4 and 6, respectively, or in another embodiment, rounded, diagonal or any other configuration. The ability to control the shading of the mask or the geometry of the stamp or units, and ultimately the directionality of ion bombardment through the plasma sheath can provide the precise formation of a desired fluid channel including offset and/or symmetrical channels. The controllable factors that allow precise formation of fluid channels within the exemplary processes using gray scale technology can include manipulating the amount (e.g. constant or variable) of UV light that passes through the mask, the transparency of the individual "pixels" of the exposure mask and/or the thickness and type of material layer, to name but a few examples. Similar factors can vary the precise formation of fluid channels when utilizing contact printing. Of course, additional material layers or masking techniques may be added to create any surface topography to control the etch of one or more desired fluid channels.

Figure 9A:
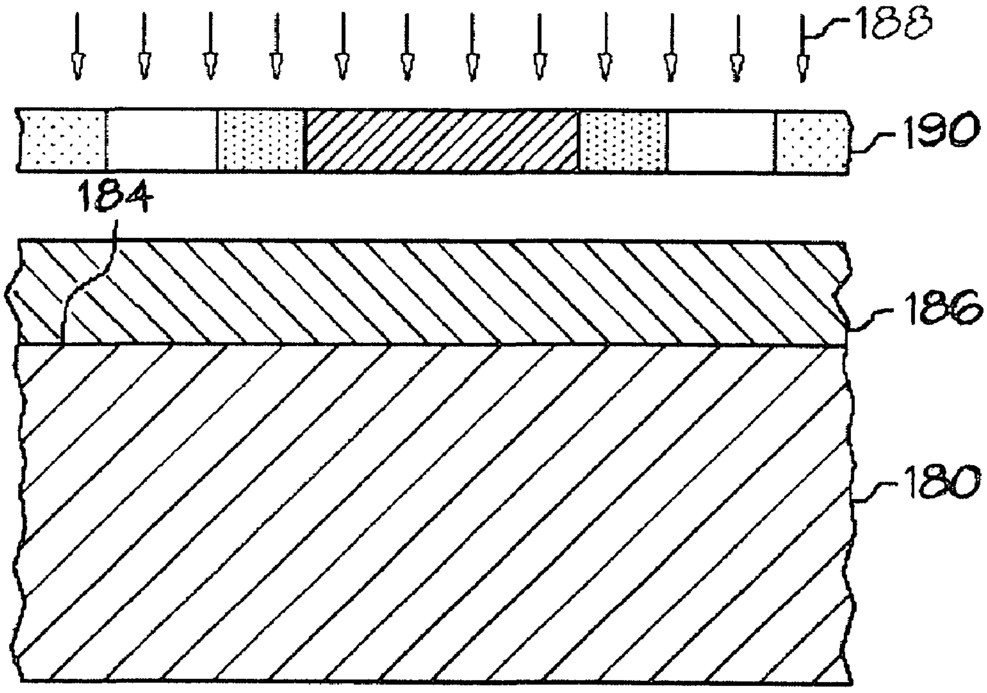
FIGS. 9-11 are schematic representations of a process for preparing a semiconductor substrate for use in an ink jet printhead in accordance with another exemplary embodiment of the present invention.
Figure 9B:
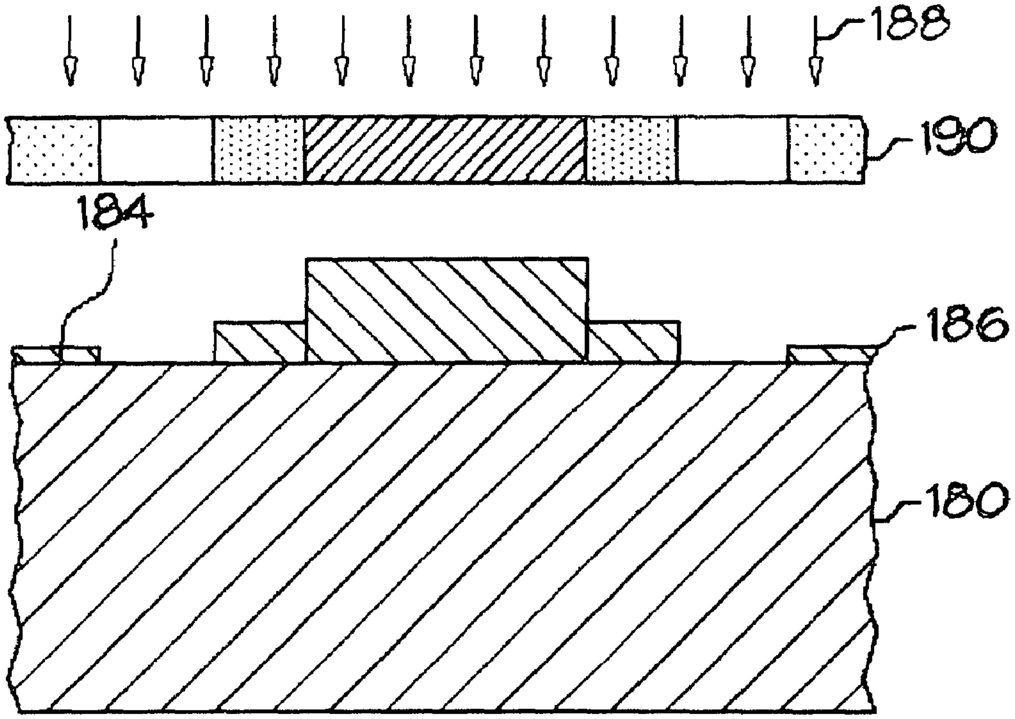
Figure 10:
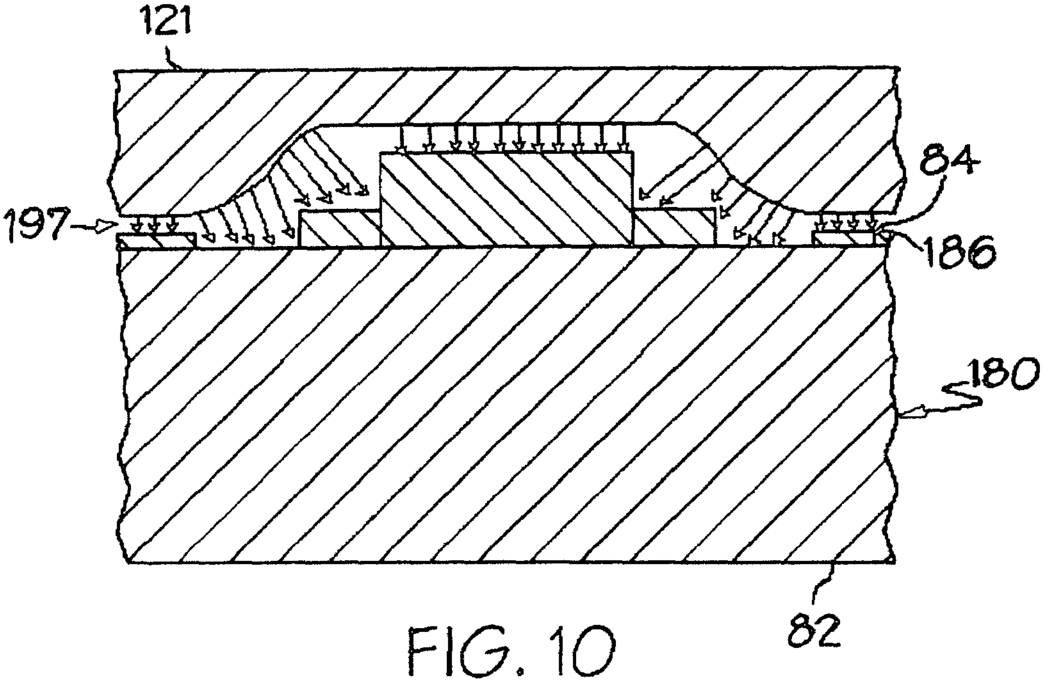
Figure 11:
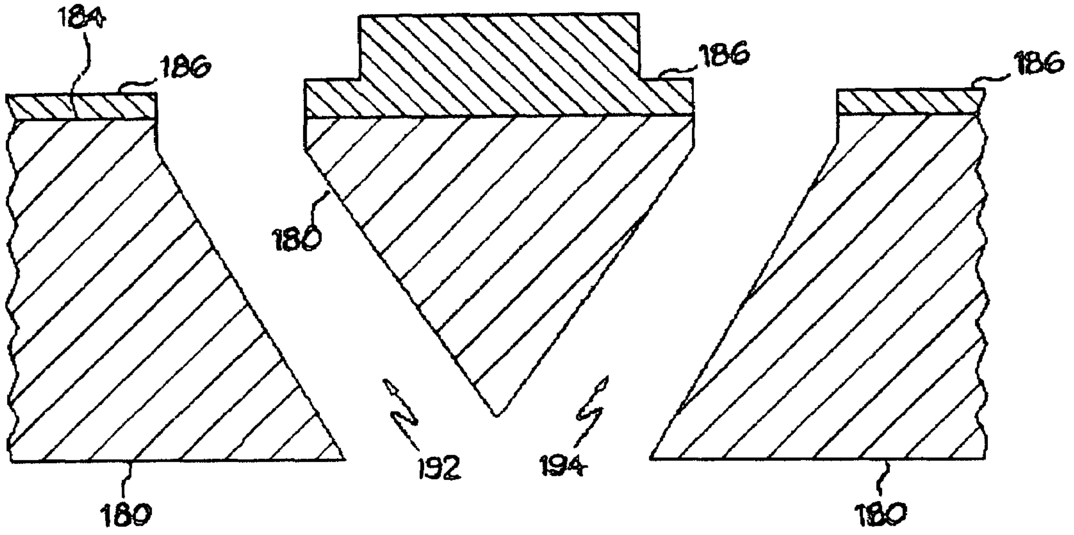

Consequently, the exemplary processes described herein may be utilized to form fluid channels (e.g., offset and/or symmetrical) comprising a number of configurations. For example, referring to FIG. 9, a semiconductor substrate 180 may include a material layer 186 (e.g. a positive photo resist layer) spin-coated onto a first side 184 of the semiconductor substrate 180. As illustrated, ultraviolet (UV) radiation 188 may be applied to the material layer 186 on the surface 184 of the semiconductor substrate 180 through a gray scale mask 190 configured with a pattern corresponding to the geometry of desired fluid channel (e.g. 192 and 194 in FIG. 10) within the semiconductor substrate 180. In this exemplary embodiment, it should be appreciated that the pattern of the exposure mask may be such to form offset fluid channels (e.g. 192 and 194 in FIG. 9). In addition, as previously discussed, by manipulating the shading of the mask (or the geometry of the stamp used in contact printing), the topography of the material layer 186, and ultimately the semiconductor substrate 180 may similarly be manipulated to form a specifically desired fluid channel. Referring to FIG. 9, once UV radiation 188 is applied to the material layer 186 through the mask 190, and the subsequent image in the material layer 186 is developed, the material layer 186 and/or the surface of the substrate may form a topography corresponding to the pattern of the mask 190 of FIG. 9. Referring to FIG. 10, the material layer 186 and semiconductor substrate 180 may then be etched as previously discussed wherein plasma 121 may be coupled to polymer 186 and/or substrate 180. The directionality of the ions along field lines 197, during the etch process, yield a structure similar to that of FIG. 11. It should be understood that the unique structure of FIG. 11 comprises two offset fluid channels 192 and 194 meeting on the device side 182 of the substrate 180. Of course, the structure of FIG. 11 is only one of a multitude of configurations made possible through the exemplary processes described herein.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method of manipulating plasma sheath formation comprising:

applying a material layer to at least one surface of a semiconductor substrate; and manipulating the material layer to form a surface topography corresponding to a channel, said surface topography being configured to control directionality of ion bombardment of said substrate substantially along electromagnetic field lines in a plasma sheath coupled to said surface topography.

2. The method of manipulating plasma sheath formation as in claim 1, wherein said manipulating said material layer comprises providing a gray scale mask configured with a pattern corresponding to said fluid channel and exposing said material layer to sufficient light radiation energy through said gray scale mask.

3. The method of manipulating plasma sheath formation as in claim 1, wherein said manipulating said material layer comprises contact printing said material layer with a stamp.

4. The method of manipulating plasma sheath formation as in claim 3, wherein said stamp comprises a plurality of units geometrically corresponding to said fluid channel.

5. The method of manipulating plasma sheath formation as in claim 1, wherein said surface topography corresponds to a pattern of a gray scale mask.

6. The method of manipulating plasma sheath formation as in claim 1, further comprising manipulating the electron temperature of said plasma.

7. The method of manipulating plasma sheath formation as in claim 1, further comprising manipulating the voltage of said plasma.

8. The method of manipulating plasma sheath formation as in claim 1, wherein said channel is offset.

9. The method of manipulating plasma sheath formation as in claim 1, wherein said fluid channel comprises a plurality of vias.

10. A method of forming a channel in a semiconductor substrate comprising:

applying a material layer to at least one surface of a semiconductor substrate;

manipulating said material layer with a patterning element to form a surface topography corresponding to a channel, said surface topography being configured to control directionality of ion bombardment of said substrate substantially along electromagnetic field lines in a plasma sheath coupled to said surface topography; and etching said substrate to form said channel.

11. The method of forming a channel as in claim 10, wherein said patterning element comprises a gray scale mask.

12. The method of forming a channel as in claim 10, wherein said patterning element comprises a contact print stamp.

13. A method for manufacturing a printhead for an ink jet printer, the method comprising:

applying a material layer to at least one surface of a semiconductor substrate; and manipulating the material layer to form a surface topography corresponding to a channel to be formed by an etch and based on expected ion travel through a plasma sheath coupled to said surface topography;

etching said substrate to form said channel; and attaching said semiconductor substrate to a nozzle plate, an electrical circuit and a printhead body to form an ink jet printhead.

14. The method of manufacturing a printhead as in claim 13, wherein said manipulating said material layer comprises providing a gray scale mask configured with a pattern corresponding to said fluid channel and exposing said material layer to sufficient light radiation energy through said gray scale mask.

15. The method of manufacturing a printhead as in claim 13, wherein said manipulating said material layer comprises applying a stamp to said material layer.

16. A method of controlling the directionality of an etch comprising:

manipulating a topography of a semiconductor substrate to correspond to a channel to be formed by an etch and based on expected ion travel through a plasma sheath coupled to said topography; and etching said substrate to form said channel.

17. The method of controlling the directionality of an etch as in claim 16, further comprising applying a material layer to a surface of the semiconductor substrate.

18. The method of controlling the directionality of an etch as in claim 16, wherein said channel is offset.

19. A method of forming an offset fluid channel in a semiconductor substrate comprising controlling directionality of ion bombardment along electromagnetic field lines in a plasma sheath to form the offset fluid channel.

* * * * *